United States Patent
Prasad et al.

(10) Patent No.: US 7,813,894 B2
(45) Date of Patent: Oct. 12, 2010

(54) METHOD AND SYSTEM FOR ASSESSING THE PERFORMANCE OF CRUDE OILS

(75) Inventors: Vijaysai Prasad, Bangalore (IN); Yatin Tayalia, Bangalore (IN); Sunil Shirish Shah, Karnataka (IN); Collin W. Cross, Houston, TX (US)

(73) Assignee: General Electric Company, Schenectady, NY (US)

( * ) Notice: Subject to any disclaimer, the term of this patent is extended or adjusted under 35 U.S.C. 154(b) by 767 days.

(21) Appl. No.: 11/610,587

(22) Filed: Dec. 14, 2006

(65) Prior Publication Data

US 2008/0147365 A1    Jun. 19, 2008

(51) Int. Cl.
*G06F 19/00* (2006.01)
(52) U.S. Cl. .................................. 702/182; 235/449
(58) Field of Classification Search .................. 702/6, 702/14, 22, 23, 174, 182–185, 188
See application file for complete search history.

(56) References Cited

U.S. PATENT DOCUMENTS

| 5,412,581 A | 5/1995 | Tackett |
| 2005/0050009 A1* | 3/2005 | Gardner et al. ............... 707/2 |
| 2005/0133211 A1 | 6/2005 | Osborn et al. |
| 2006/0073013 A1* | 4/2006 | Emigholz et al. ............. 416/35 |

FOREIGN PATENT DOCUMENTS

| EP | 0241233 A | 10/1987 |
| GB | 1564757 A | 4/1980 |
| WO | WO9826026 A | 6/1998 |

OTHER PUBLICATIONS

International Search Report issued in connection with corresponding PCT/US2007/084913, Aug. 13, 2008 from European Patent Office.
"Fouling Models for Real Time Heat Exchanger Fouling Detection", Aug. 14, 2005, Silva C.D.S. et al., Rio de Janeiro, Brazil, whole document.
"Heat Exchanger Fouling Causes Problems in Gas and Liquid Systems", Reza Hashemi et al., American Filtration Society Seminar May 11, 1992, whole document.

* cited by examiner

*Primary Examiner*—Edward Raymond
(74) *Attorney, Agent, or Firm*—GE Global Patent Operation; Catherine J. Winter; Barbara A. Toop

(57) ABSTRACT

A methodology and system is disclosed which addresses outstanding needs of refiners to process cheaper crudes or blends of crudes. This method and system comprises a number of steps, including characterizing the impact of various constituents in the crude which result in fouling of heat exchangers; estimating model parameters; monitoring and predicting qualitative and quantitative performance; and determining optimal dosage of chemical treatments.

9 Claims, 3 Drawing Sheets

METHOD AND SYSTEM FOR ASSESSING THE PERFORMANCE OF CRUDE OILS

FIELD OF THE INVENTION

The present invention relates to the processing of crude oils, and more particularly to a method and system for predicting the performance of crude oils and crude oil blends. Specifically, the present method provides a means to allow oil refiners to process blends of crude oils that include less optimal oils, while lowering the risks involved due to fouling of operating equipment, particularly heat exchange networks, and thereby operating the oil refinery in more economical and ecologically beneficial ways.

BACKGROUND OF THE INVENTION

Oil refineries are under intense pressure to process lower quality crudes for reason of price or availability, or both. Unfortunately, in many cases, oil refiners do not possess enough information and knowledge about certain crudes and crude blends and how they behave in an operating environment to make processing these crudes feasible. Individual refiners only have access to information and knowledge about crudes they have actually tested or used.

In an effort to address the problem of not possessing enough information about certain crudes and how they behave in an operating environment, some refiners have begun to use laboratory simulations to develop predictive models of certain performances. These models, however, are limited and do not address specific, often complex problems that may arise during processing of these crudes and how these problems can be alleviated by using appropriate chemical treatment solutions. U.S. Pat. No. 5,412,581 discloses and claims a process for predicting and evaluating the physical properties of hydrocarbons using spectrometry.

Linear programming systems have also been implemented which focus on defining crude cut and the corresponding cut yield, but these systems do not address the use of treatment chemical in the crude selection mode, nor do they assess the amount of fouling in equipment during processing to allow for a risk assessment of the lower cost crudes. These methods cannot tell refiners how the crude blends will effect operations and equipment. Therefore, refiners lack critical information they require to access the risk and economic viability of using lower quality crudes.

Crude preheat train fouling is not a well-understood phenomena. Many times refiners do not have enough information to determine whether or not the use of a new crude or crude blend is fouling up the refinery equipment, particularly heat exchange networks. Fouling of the heat exchange network can result in rapid decrease in furnace inlet temperature and lead to substantial economic and environmental consequences. Although proper chemical treatment can extend the life of the heat exchangers, lack of quantitative understanding of the phenomenon makes proposing a treatment more challenging. Therefore, it is desirable to have the ability to quantify the fouling propensity of a particular crude being processed and its impact on operating conditions.

Accordingly, there is a need for means for assessing and evaluating crude selection, and predicting the cost and risk associated therewith.

More particularly, there is a need to determine the optimal dosing of the crudes with treatment chemicals so that crude blends including cheaper crudes can be utilized without detrimental effects on the operating equipment of the refineries, such as fouling of the heat exchange networks.

More particularly, what is needed is a methodology and system which enables refineries to process cheaper or opportunity crudes, or blends comprising opportunity crudes, by using models to predict the fouling propensity of said crudes. The methodology should enable refineries to achieve benefits of using cheaper crudes, lower potential treatment chemical costs, increase throughput, extend run lengths and lower operating costs all in a more ecologically beneficial environment.

SUMMARY OF THE INVENTION

A methodology and system is disclosed which addresses outstanding needs of refiners to process cheaper crudes or blends of crudes. This method and system comprises a number of steps, including characterizing the impact of various constituents in the crude which result in fouling of heat exchangers; estimating model parameters; monitoring and predicting qualitative and quantitative performance; and determining optimal dosage of chemical treatments. The methodology and system disclosed herein addresses issues which arise due to scaling of crude preheat trains resulting from chemically reactive fouling species in the crude, disposition of the suspended or reactive species in the crude on the heat transfer surfaces and lack of attention to the operating conditions of each individual exchanger in the crude preheat network. The combination of the above listed phenomena deteriorates performance of individual heat exchangers in the network and results in reduction of the furnace inlet temperature.

Embodiments of the presently claimed invention allow refiners to process larger percentages of opportunity crudes by recommending optimal blend ratios and optimal process conditions, in particular surface temperature and velocity of the crudes. In addition, it quantifies any future reduction in the percent cleanliness of each heat exchanger in the network. Once in possession of this information, the refiners can determine the necessary chemical treatment is determined by quantifying the impact of various chemicals, enabling the selection of the best possible treatment to mitigate the performance degradation of the heat exchange network, quantify the improvement in the performance through the appropriate chemistry and optimizing the dosage of the treatment chemicals depending on the crude being processed.

DETAILED DESCRIPTION OF THE INVENTION

The singular forms "a ," "an" and "the" include plural referents unless the context clearly dictates otherwise.

The modifier "about" used in connection with a quantity is inclusive of the stated value and has the meaning dictated by the context (e.g., includes the degree of error associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

Crudes and crude blends are used interchangeably and each are intended to include both a single crude and blends of crudes.

Figure 1:
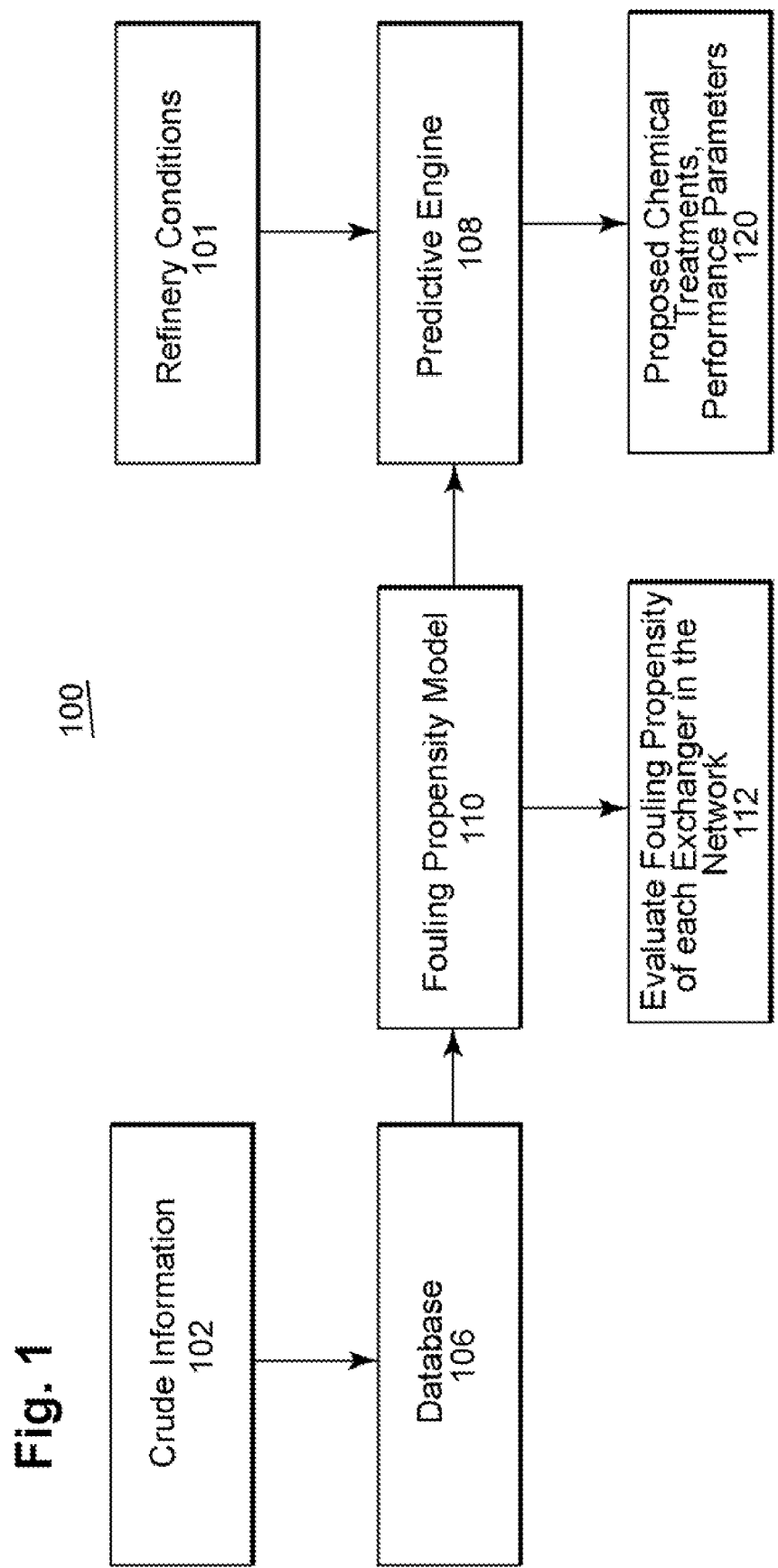
FIG. 1 is a block diagram of an illustrative embodiment of a system for recommending optimal crude blends and chemical treatments for those blends.

A method and system is taught for evaluating crudes and crude blends, specifically, characterizing the impact of various constituents of the crudes on fouling of heat exchangers and recommending optimal chemical treatments to minimize the fouling and thereby reduce the rate of decrease in the furnace inlet temperature. The system and method of the invention is described herein with reference to FIGS. 1 and 2. With reference to FIG. 1, there is shown a block diagram of one embodiment of the system for detecting the parameters of the crudes, predicting the performance of the heat exchange network and proposing the chemical treatment as designated generally by reference numeral 100. The system 100 comprises a property database 106, more particularly known as a hot liquid process simulator ("HLPS") which stores a massive amount of data, including experimental data, relating to different types of crudes 102, their characterizations, operating and refinery conditions under which the crudes were processed along with any associated processing difficulties and/or performance or risk parameters, and laboratory simulation data. The method and system use the data as the basis for at least one predictive performance model and/or at least one risk assessment model designed to optimize the blend composition, the chemical treatment and/or the operating conditions 120 of the heat exchange network.

Figure 2:
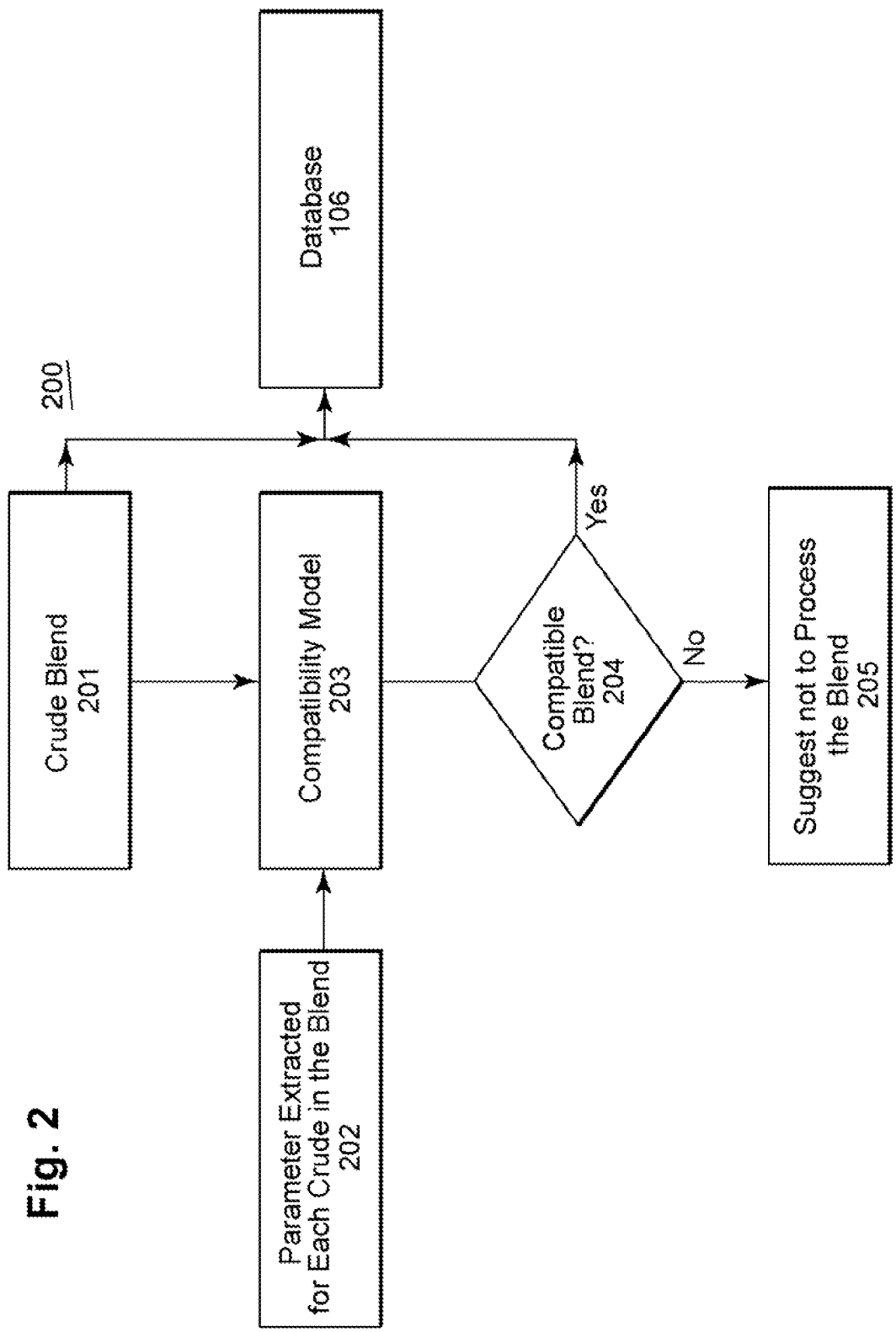
FIG. 2 is a block diagram of an illustrative embodiment of a crude preheat train fouling prediction framework.
Figure 3:
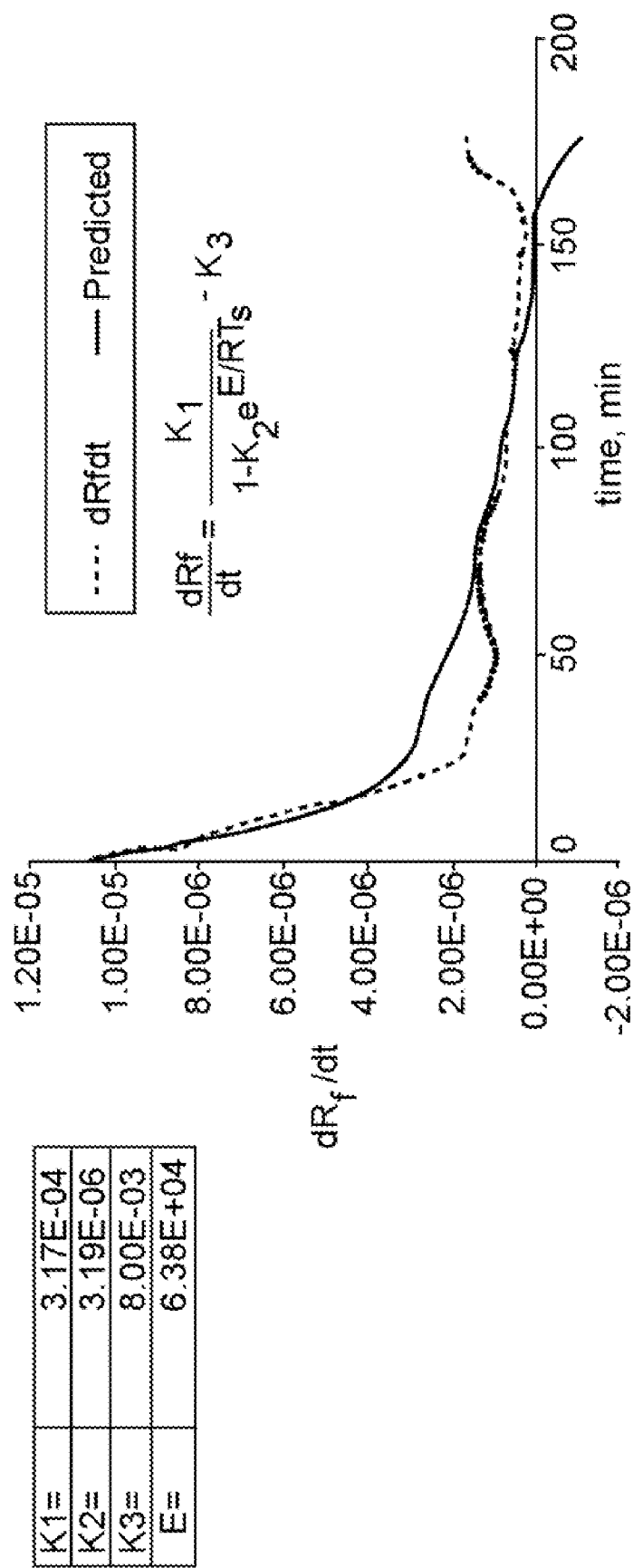
FIG. 3 is a parameter estimation for lab experiments.

The information contained in the database comprises crude information 102, which is obtained as shown in FIG. 2. The information detected from each crude 202 is provided, along with the particular crude blend 201, at which point a determination is made as to whether or not the blend is compatible 204 with the particular refinery and product requirements. If it is determined that the crude is compatible, then the information proceeds to the database. If the determination is no, then it is suggested not to use the crude 205. This crude information 102 is then stored in the HLPS database 106. Lab scale studies can be conducted to determine the particular parameters for individual crudes. The properties are then later estimated for the blend having different crudes in known quantities. The parameters thus extracted are then corrected for the operating conditions specific to the refinery and used in the fouling rate predictive engine 108 in a subsequent step.

One step in the methodology encompasses the means to identify and detect parameters of the fouling propensity model 110. This step primarily seeks to detect the fouling propensity of individual crude samples, which will then be used to predict the fouling tendency 112 of the crude blends incorporating said particular crude. Two operating conditions which impact the rate of fouling are the surface or skin temperature and the velocity of the crude through the heat exchangers. Additional parameters that optimally may be considered in this step are the mass transfer characteristics, the reactive nature of the foulant species in the crude, and the bulk surface temperature.

The data on the crudes can be also be used for defining and recommending compatible blend ratios, as well as optimal blends dependent on the operating conditions of a particular refinery.

Further included in the system 100 is the predictive engine 108 used to predict the performance of the heat exchanger network. FIG. 2 shows a block diagram depicting one embodiment of the overall system 200 for the crude preheat train fouling prediction framework. As discussed above, the crude information 102 corresponding to a particular crude or crude blend is input to determine compatibility. If compatibility is found, then the crude information 102 proceeds to the HLPS database 106. That information will then be used to predict the performance of individual exchangers by subjecting the data to the fouling propensity model 110, which will evaluate the fouling propensity of each exchanger in the network 112 and the exchangers will be qualified. They will be indicated as a) exchangers that will have accelerated fouling; b) exchangers that could be marginally at the risk of accelerated fouling; and c) exchangers which will not be significantly affected.

The predictive engine 108 will then be able to use the compiled information to determine the future fouling trend for each of the exchangers and subsequently for the entire heat exchange network. The key parameters used in the model are the diffusion coefficient, foulant concentration, reaction rate constant and the activation energy. This information is compiled and provided, along with additional data, as refinery conditions 101. Thus, this framework provides for the prediction of furnace inlet temperature as a function of the crude or crude blend being processed.

In addition, the information on the crudes and the predictive engine 108 can be used to define optimal processing conditions, namely the surface temperature and velocity of the crudes so as to lower the fouling rate of individual heat exchangers in the network.

The third step or tier in this method or system is the chose of operating conditions and application of chemical treatment to optimize the processing of the crudes and minimize the risk of fouling of the heat exchangers and the overall network. Taking into account the information on the crudes and the prediction of fouling as determined in the above tiers or steps, the refinery can determine the optimal dosage of chemical treatment, and performance paramameters 120. This is done by quantifying the impact of different chemicals on the crudes and on their fouling potential, and enabling the selection of the best possible treatment to mitigate the performance degradation of the heat exchange network. Therefore, the improvement in the performance through the appropriate chemistry is quantified, and the dosage of the chemicals is optimized depending on the crude being processed.

Ultimately, the model enables the refinery to quantify the savings with and without treatment of the crudes. By assessing different crudes and crude blends, this system provides for a risk assessment of using the cheaper crudes. The optimal dosage of chemicals can be predetermined and therefore the corresponding cost of such is known prior to using the crudes, as is the detrimental or fouling effect of the crudes on the heat exchange network, thereby allowing for the risk assessment as to the fouling of the network and any corresponding shortening of life of the equipment.

In order to more clearly illustrate this invention, the data set forth below were developed. The following examples are included as being illustrations of the invention and should not be construed as limiting the scope thereof.

EXAMPLE

A lab scale experiment to run the crude and crude blends through an electrically heated exchanger was set up. A detailed first principle fouling model for the lab scale studies was formulated. An analysis was conducted to run the experiments to capture the effect of temperature, composition and the impact of chemicals. See Table I below. The experiments were run for different blanc crudes and crude blends at different surface temperatures. The experiments were then repeated with an addition of chemicals to the same blanc crudes. Parameters of the fouling model were extracted for the runs. A first principle based on fouling rate model was formulated for a scaled-up heat exchanger which involved the effect of shear due to turbulence. The parameters derived above were used in the fouling rate model for one of the beta sites where exchangers were classified as high risk, medium risk and low risk exchangers. The details are given in FIG. 1A.

TABLE I

| | | | | Experimental Parameters (ΔT mode) | | | |
|---|---|---|---|---|---|---|---|
| Run No. | Crude | Composition | Vol. Flowrate, ml/min | Control Rod Temperature | Initial Outlet Temperature | Initial Inlet Temperature | Final Outlet Temperature |
| | | | | Continously monitored with time (Time series data) | | | |
| 1 | Troll Blank | 100% | 3 | 428 | 330 | 36 | 350 |
| 2 | Tengize Blank | 100% | 3 | 428 | 321 | 36 | 231 |
| 3 | Sahara Blend Blank | 100% | 3 | 428 | 328 | 42 | 257 |
| 4 | Chops Blank | 100% | 3 | 428 | 329 | 34 | 308 |
| 5 | Flint Hills 442 Blank | 100% | 3 | 428 | 336 | 43 | 263 |
| 6 | M-100/Sahara Blend Blank | 100% | 3 | 428 | 341 | 47 | 293 |
| 7 | Tengize + 1000 ppm 7R29 | 100% | 3 | 428 | 333 | 41 | 249 |
| 8 | Sahara Blend + 1000 ppm 7R29 | 100% | 3 | 428 | 331 | 46 | 272 |
| 9 | Chops + 1000 ppm 7R29 | 100% | 3 | 428 | 332 | 36 | 311 |
| 10 | Chops + 1000 ppm 3F18 | 100% | 3 | 428 | 326 | 42 | 305 |
| 11 | Flint Hills 442 + 1000 ppm 7R29 | 100% | 3 | 428 | 336 | 40 | 276 |
| 12 | M-100/Sahara Blend + 1000 ppm 7R29 | 100% | 3 | 428 | 332 | 39 | 273 |
| 13 | A + B | Compatible blend | 3 | 428 | | | |
| 14 | B + C | Compatible blend | 3 | 428 | | | |
| 15 | C + D | Compatible blend | 3 | 428 | | | |
| 16 | D + E | Compatible blend | 3 | 428 | | | |
| 17 | A + E | Compatible blend | 3 | 428 | | | |
| 18 | A + B | Compatible blend | 4 | ? | | | |
| 19 | B + C | Compatible blend | 5 | ? | | | |
| 20 | C + D | Compatible blend | 6 | ? | | | |
| 21 | D + E | Compatible blend | 8 | ? | | | |
| 22 | A + E | Compatible blend | 10 | ? | | | |

| | | Experimental Parameters (ΔT mode) | | | | | |
|---|---|---|---|---|---|---|---|
| Run No. | Final Inlet Temperature | Initial Rod Cold Side Temp | Final Rod Cold Side Temp | Pressure | Delta T Initial Outlet – Final Outlet | % Reduction Delta T Treated | Deposit Wt. (mg) | % Reduction Deposit Weight Treated |
| 1 | 43 | 232 | 255 | 800 | −20 | | 0.6 | |
| 2 | 41 | 231 | 253 | 800 | 90 | | 97.2 | |
| 3 | 41 | 227 | 185 | 800 | 71 | | 10.1 | |
| 4 | 38 | 227 | 211 | 800 | 21 | | 31.4 | |
| 5 | 43 | 230 | 184 | 800 | 73 | | 47.4 | |
| 6 | 45 | 232 | 205 | 800 | 48 | | 29.9 | |
| 7 | 40 | 228 | 176 | 800 | 84 | 7 | 32.5 | 67 |
| 8 | 46 | 205 | 172 | 800 | 59 | 17 | 12.9 | −28 |
| 9 | 39 | 204 | 196 | 800 | 21 | 0 | 23.5 | 25 |
| 10 | 47 | 219 | 210 | 800 | 21 | 0 | 38.3 | −22 |
| 11 | 47 | 227 | 189 | 800 | 60 | 18 | 16.4 | 65 |
| 12 | 41 | 225 | 189 | 800 | 69 | −23 | 19.2 | 36 |
| 13 | | | | | | | | |
| 14 | | | | | | | | |
| 15 | | | | | | | | |
| 16 | | | | | | | | |
| 17 | | | | | | | | |
| 18 | | | | | | | | |
| 19 | | | | | | | | |
| 20 | | | | | | | | |
| 21 | | | | | | | | |
| 22 | | | | | | | | |

While typical embodiments have been set forth for the purpose of illustration, the foregoing descriptions should not be deemed to be a limitation on the scope herein. It is apparent that numerous other forms and modifications of this invention will occur to one skilled in the art without departing from the spirit and scope herein. The appended claims and these embodiments should be construed to cover all such obvious forms and modifications that are within the true spirit and scope of the present invention.

Having described the invention, that which is claimed is:

1. A system for evaluating the risk of opportunity crudes or crude blends on refinery operations comprising:
    a database storing data related to at least one crude or crude blend; and
    a predictive engine comprising a fouling propensity model for executing at least one prediction of the fouling propensity of a heat exchanger in a heat exchange network, wherein each heat exchanger in the heat exchange network is qualified as either one of:
    a heat exchanger with accelerated fouling, a heat exchanger that is marginally at a risk of accelerated fouling, or a heat exchanger that will not be significantly affected.

2. The system in accordance with claim 1 wherein the predictive engine takes as input crude information comprising at least one of surface or skin temperature and velocity of the crude through the heat exchanger.

3. The system in accordance with claim 2 which further takes as input crude information at least one of mass transfer characteristics, reactive nature of the foulant species in the crude, and bulk surface temperature.

4. The system in accordance with claim 1 wherein the predictive engine takes as input refinery operating parameters and/or conditions.

5. The system in accordance with claim 1 wherein the fouling propensity model will qualify each heat exchanger in a heat exchange network.

6. The system in accordance with claim 1 which further provides a future fouling trends for each heat exchanger and the heat exchange network.

7. A system for evaluating the risk of opportunity crudes or crude blends on refinery operations comprising:
    a database storing data related to at least one crude and/or crude blend and refinery operating conditions;
    a predictive engine comprising a fouling propensity model for executing at least one prediction of the fouling propensity of a heat exchanger in a heat exchange network, wherein each heat exchanger in the heat exchange network is qualified as either one of:
    a heat exchanger with accelerated fouling, a heat exchanger that is marginally at a risk of accelerated fouling, or a heat exchanger that will not be significantly affected; and
    application of chemical treatment to optimize processing of the at least one crude and/or crude blend and minimize the risk of fouling of the heat exchanger network.

8. A method for quantifying the savings available in refinery operations by using opportunity crudes or crude blends, comprising:
    storing data related to at least one crude and/or crude blend and refinery operating conditions in a database;
    analyzing the data from the database in a predictive engine, the predictive engine having a fouling propensity model for executing at least one prediction of the fouling propensity of a heat exchanger in a heat exchange network, wherein each heat exchanger in the heat exchange network is qualified as either one of: a exchanger with accelerated fouling, a exchanger that is marginally at a risk of accelerated fouling, or a exchanger that will not be significantly affected; and
    applying a chemical treatment to optimize processing of the at least one crude and/or crude blend and minimize the risk of fouling of the heat exchanger network based on the prediction of the fouling propensity model and the data from the database.

9. A system for evaluating the risk of opportunity crudes or crude blends on refinery operations comprising:
    a database storing data related to at least one crude and/or crude blend and refinery operating conditions;
    a predictive engine comprising a fouling propensity model for executing at least one prediction of the fouling propensity of a heat exchanger in a heat exchange network by using the data stored in the database, wherein each heat exchanger in the heat exchange network is qualified as either one of: a exchanger with accelerated fouling, a exchanger that is marginally at a risk of accelerated fouling, or a exchanger that will not be significantly affected; and
    application of chemical treatment and operating conditions to optimize processing of the at least one crude and/or crude blend and minimize the risk of fouling of the heat exchanger network, wherein the chemical treatment and operating conditions are determined based on the prediction of the fouling propensity model and the data stored in the database.

* * * * *